United States Patent
Degani et al.

(10) Patent No.: US 11,846,724 B2
(45) Date of Patent: Dec. 19, 2023

(54) RADAR DETECTION IN ENVIRONMENTS WITH DISTURBING ELEMENTS

(71) Applicant: Inxpect S.p.A., Brescia (IT)

(72) Inventors: Alessio Degani, Brescia (IT); Andrea Tartaro, Brescia (IT); Marco Garatti, Brescia (IT); Ugo Bertacchini, Brescia (IT)

(73) Assignee: Inxpect S.p.A., Brescia (IT)

( * ) Notice: Subject to any disclaimer, the term of this patent is extended or adjusted under 35 U.S.C. 154(b) by 297 days.

(21) Appl. No.: 17/341,507

(22) Filed: Jun. 8, 2021

(65) Prior Publication Data
US 2021/0389422 A1    Dec. 16, 2021

(30) Foreign Application Priority Data
Jun. 11, 2020    (IT) .......................... 102020000013993

(51) Int. Cl.
*G01S 7/41*    (2006.01)
*G01S 13/56*    (2006.01)
*G01S 13/88*    (2006.01)

(52) U.S. Cl.
CPC .............. *G01S 7/415* (2013.01); *G01S 13/56* (2013.01); *G01S 13/886* (2013.01)

(58) Field of Classification Search
CPC ......... G01S 7/415; G01S 13/56; G01S 13/886
See application file for complete search history.

(56) References Cited

U.S. PATENT DOCUMENTS

| | | |
|---|---|---|
| 5,281,947 A | 1/1994 | Durley et al. |
| 5,424,745 A | 6/1995 | Fonsny |
| 2014/0266860 A1 | 9/2014 | Blumrosen et al. |
| 2018/0074178 A1* | 3/2018 | Cook ...................... G01S 13/04 |
| 2019/0107613 A1* | 4/2019 | Degani ................. G01S 13/886 |
| 2021/0278545 A1* | 9/2021 | Endo ..................... G01S 17/931 |

FOREIGN PATENT DOCUMENTS

| | | |
|---|---|---|
| EP | 2716821 | 4/2014 |
| KR | 101800130 B1 * | 7/2016 |
| WO | 2019000047 | 1/2019 |

OTHER PUBLICATIONS

International Search Report dated Feb. 24, 2021; Application IT 102020000013993; 11 pages.

* cited by examiner

*Primary Examiner* — Peter M Bythrow
*Assistant Examiner* — Nazra Nur Waheed
(74) *Attorney, Agent, or Firm* — Mark Bandy; Rankin Hill & Clark, LLP

(57) ABSTRACT

Herein disclosed is a method for radar detection of a valid target within a monitored zone with disturbing elements passing therethrough, e.g. process scraps of a machine on which the radar system is installed. The method includes transmitting, receiving and processing radar signals to locate and track the movement of a moving potential target. The method discriminates whether the potential target is valid or not, by checking whether the potential target has an initial position within a disturbance zone and whether it is detected for an overall detection time period that is less than the assessment time interval. If a target is not valid, it will be assimilated to background after it stops.

11 Claims, 2 Drawing Sheets

RADAR DETECTION IN ENVIRONMENTS WITH DISTURBING ELEMENTS

FIELD OF THE INVENTION

The present invention relates to a method for radar detection and to a radar system in the field of workplace safety.

The present invention is advantageously used in industrial environments, for detecting the access or presence of an operator in a hazardous area. In particular, the present invention finds application in monitoring an alarm area surrounding an industrial machine which generates process scraps, such as water drops or chips, when in operation.

DESCRIPTION OF THE RELATED ART

Radar detection methods and radar systems are known in the art to be used to monitor the safety of operators in workplaces.

For example, with a machine in operation, a known method includes defining an alarm area near the machine, to be monitored by a radar system. When an operator comes near the machine, and specifically enters this area, the radar system detects his/her presence. Therefore, in this case, prior art methods and/or systems provide that measures are taken, such as sending an alarm or switching off the machine to protect the operator.

Problem of the Prior Art

The prior art methods and systems recognize any element detected in the alarm area as a target. Therefore, with a machine that generates process scraps, any scrap entering and/or falling into the alarm area is identified as a target, resulting in unreliable detection.

That is, an identified target does not always indicate the actual presence of an operator in the area, with the risk of generating false alarms and stopping machines even when there is no real danger.

SUMMARY OF THE INVENTION

Therefore, the purpose of the present invention is to provide a radar detection method and a radar system for workplace safety that can obviate the aforementioned prior art drawbacks.

In particular, an object of the present invention is to provide a radar detection method and a radar system that can be efficiently employed even with process scrap-generating machines, as they can detect the presence of an operator within a monitored area, and avoid false alarms if scraps are present.

The aforementioned technical purpose and objects are substantially fulfilled by a method and a device that comprise the technical features as disclosed in one or more of the accompanying claims.

Advantages of the Invention

The present invention provides a method and a radar device that can reliably detect the presence of an operator within a monitored area.

The method and system of the present invention solve the technical problem by being able to distinguish scraps from operators. This distinction is based on the assumption that a processing scrap is detected from the start near the radar and stops after a short distance, whereas an operator enters the monitored area from a position that is far from the radar.

Accordingly, the method and system reliably avoid false alarms.

BRIEF DESCRIPTION OF THE DRAWINGS

The characteristics and advantages of the present invention will result from the following detailed description of a possible practical embodiment, illustrated as a non-limiting example in the annexed drawings, in which.

DETAILED DESCRIPTION

Figure 1:
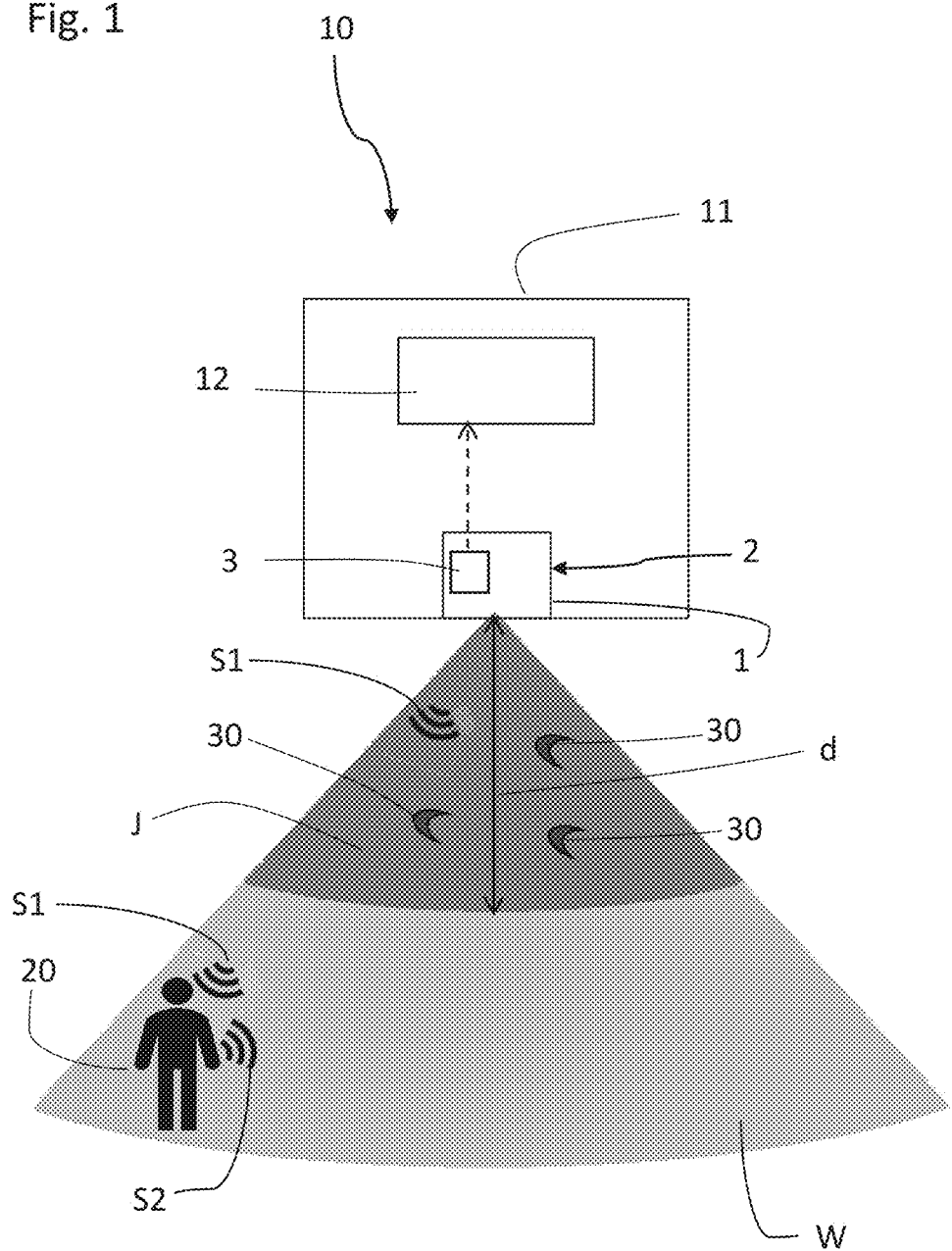
FIGS. 1 and 2 are schematic views of an environment in which a system of the present invention is installed.

Referring to the accompanying drawings, the present invention relates to a method for radar detection of a valid target within a monitored zone W. This monitored zone W is an alarm zone, that is a hazardous zone for an operator 20.

In particular, the monitored zone W is configured as a zone where not only a moving target possibly in danger may access, but that is also affected by the passage of disturbing elements 30, specifically objects or other types of bodies, generally of small size, which reflect the radar signal and can be thus detected, thereby disturbing the detection of more important targets or generating false alarms.

Therefore, any disturbing elements 30 in the monitored zone W must be recognized as such to be filtered out, to distinguish an operator 20 possibly present within the monitored zone W. This allows reducing the probability of generating false alarms caused by the presence of such disturbing elements 30, and effectively notifying real hazard conditions for an operator 20.

According to the present invention, the monitored zone W is a zone defined near a machine 11 that generates process scraps, such as chips or water drops. In particular, such scraps represent the disturbing elements 30.

In order to distinguish a scrap entering the monitored zone W from an operator 20, the method includes defining a disturbance zone J in the monitored zone W. In particular, the disturbance zone is defined as a drop zone for the scrap generated by the machine 11 in operation. More in detail, this disturbance zone J is a zone proximal to the machine 11 that can be accessed by the scraps from the machine 11. Further details about the disturbance zone J will be provided below.

In order to better understand how the method distinguishes between an operator 20 and a disturbing element 30, certain known steps of operation of a radar will be now described.

The method of the present invention includes a step of cyclically generating a first radar signal S1 and cyclically transmitting it in the monitored zone W using of at least one radar device 1. In accordance with the present invention, the radar device 1 is preferably installed on the process scrap-generating machine 11.

Then, the method comprises a step of cyclically receiving a second radar signal S2. In particular, the second radar signal S2 is representative of the monitored zone W. That is, the second radar signal S2 derives from the interaction of what is present in the monitored zone W with the first radar signal S1. Elements in the monitored zone W, either fixed or moving, animated or inanimate bodies, reflect the first transmitted signal S1, and generate a specific return signal. Therefore, the second signal S2 comprises the return signals of each element within the monitored zone W.

Subsequently, the method includes receiving such second signal S2 and then cyclically processing the second signal S2 to identify signal components compatible with the presence of a moving potential target.

It should be noted that by known processing of the second signal S2, potential targets representative of both fixed and moving bodies may be detected. A first distinction will be still preferably made between fixed potential targets, generally of little interest for the purposes of the invention, and moving potential targets, still by known processing. Among moving targets, potential targets that are deemed to be valid will be distinguished from those that are deemed to be invalid in a manner that will be explained below. Preferably, any detected fixed potential targets will be deemed to be invalid.

In order to select the moving potential targets, the step of cyclically processing the second signal S2 preferably comprises a step of defining and storing background data representative of the monitored zone W in absence of moving potential targets. Specifically, the background data comprises a background profile representing a spatial distribution of the signal from the environment of the monitored zone W including the elements that are permanently present, e.g. a floor, other walls and furniture objects, generally without moving potential targets. Therefore, the background profile allows the signal component associated with a potential target entering the monitored zone W to be distinguished. In particular, it allows distinction of permanent static elements from those entering the area.

Therefore, an element that appears in the monitored zone W even temporarily represents a moving potential target.

Preferably, the second signal S2 is converted with known techniques into a detection profile, i.e. into a spatial distribution of the second signal S2 comprising signal intensity peaks corresponding to fixed or moving potential targets. Such conversion may require a combination of the second signal S2 with the first signal and a conversion of the combined signal in the frequency domain.

Then, the step of cyclically processing the second signal S2 comprises comparing the second signal S2 with the background data to identify signal components compatible with the presence of a moving potential target. More in detail, a difference profile is obtained by subtracting the background profile from the detection profile. This difference profile is representative of the presence of any moving potential targets. In other words, the difference profile comprises signal peaks attributable to the presence of a moving target.

In particular, once a moving potential target has been identified, the method comprises a step of tracking the movement of the potential target for an overall detection time period in which the potential target can be detected. During such detection time, the potential target assumes a plurality of assumed positions from a first detection time in which the potential target assumes an initial position.

Tracking the movement of the potential target is a known operation that includes generating a path for each potential target. The path includes a position assumed by the potential target for each detection cycle. At each new detection cycle in which signal components compatible with the presence of potential targets are identified, such signal components are checked for compatibility with at least one of the previously stored paths. If there is such compatibility, each path is updated with the new position assumed by the relevant potential target. If there is no such compatibility, a new path is generated for the new potential target.

In the preferred embodiment, the background profile is cyclically updated to include potential targets that stop for a time greater than or equal to a predetermined stop time. Therefore, each moving potential target is only detectable as long as it keeps moving or makes stops for less than the predetermined stop time. The background profile can be updated, for example, by means of a moving time-average of the detection profiles.

Then, the method of the present invention comprises a step of discriminating whether the potential target is a valid target or an invalid target.

An invalid target is represented by the aforementioned process scraps falling from the machine 11, whereas an operator 20 is a valid target.

In particular, this step of discriminating between a valid target and an invalid target is carried out assuming that a potential target moving in the immediate vicinity of the radar for a short time is classified as a process scrap and ignored, as described below.

In particular, in order to discriminate between a valid target and an invalid target, the method provides the steps as described below.

As mentioned above, the method of the present invention comprises a step of defining and storing a disturbance zone J defined by a portion of the monitored zone W proximal to the radar device 1, and hence to the machine 11. In particular, the disturbance zone J is defined as a subset of the monitored zone W in an area that can be accessed by the aforementioned disturbing elements 30.

Then, the method comprises a step of defining an assessment time interval. Such time interval is defined as a time required to recognize whether the potential target is an invalid target, whose movement is expected to stop before the assessment time, or a valid target.

In detail, the assessment time interval is set equal or greater than a threshold time that a test disturbing body takes to stop. The test disturbing body is represented for instance by an exemplary process scrap. So, the threshold time is the time that it takes to stop from the instant when it starts moving, which is the time in which it is generated and/or its movement becomes detectable by the radar. For example, the threshold time can be the fall time of a scrap.

The test disturbing body can be a real disturbing body for which a threshold time was measured, or a theoretic body for which the threshold time was computed. As the assessment time is selected equal to the threshold time, or greater than this by a certain margin, disturbing elements having a similar motion to the test disturbing body will stop before the end of the assessment time interval.

Thus, the method comprises the step of checking whether the potential target simultaneously fulfills a plurality of conditions. While the disturbance zone J and the assessment time are established once and for all, or periodically updated, the aforementioned conditions are checked for each target at each cycle.

A first condition to consider a potential target as invalid is that its initial position shall fall within the disturbance zone J. That is, a process scrap is assumed to necessarily come from the machine 11, and cannot be detected for the first time outside this area.

Therefore, the aforementioned conditions comprise checking whether at least the initial position of the potential target falls within the disturbance zone J.

A second condition includes checking whether the overall detection time period is less than the assessment time interval. That is, while an operator can move even for a long time, an inanimate process scrap will stop after a short time and will no longer be detected.

The assessment time interval must be appropriately selected. An excessively long assessment time interval might cause a moving target of interest to be deemed as invalid. That is, an invalid target must meet the condition of being detectable for a detection time period that is less than the assessment time interval. Therefore, if an excessively long assessment time interval were set as a threshold, even an operator that moves for a long time would meet this condition, if his/her initial position is compatible with the other conditions.

Of course, the above discussed checks are repeated cyclically, so that if a potential target, that is initially deemed as invalid, remains detectable for more time until the assessment time is exceeded, it will be reclassified as valid.

If both the above conditions are assessed (in addition to optional additional conditions that may be established by a skilled person), the method will determine that the potential target is invalid. Accordingly, the potential target is ignored. In case either or both conditions are not fulfilled, the potential target is recognized as valid and the method includes validation thereof.

In other words, if the potential target is detected in a first position within the disturbance zone J and in addition the potential target is detected as it moves for a time period that is less than the assessment time, the potential target is ignored.

Concerning the first condition, in order to consider a potential target as invalid, it must appear in a first position in the disturbance zone J. Thus, referring to the accompanying drawings, the disturbance zone J is a zone that cannot be directly accessed by an operator 20 that enters the monitored zone W. Therefore, a target that suddenly appears within the disturbance zone J without entering from outside the monitored zone W is deemed as invalid.

Concerning the overall time period for detecting the potential target, if the target is no longer detectable this means that it is stationary or is outside the disturbance zone J or the monitored zone W.

More in detail, the disturbance zone J at least partially surrounds the radar device 1.

The disturbance zone J is selected as a zone affected by the passage of disturbing elements 30 but not directly accessed by an operator 20.

According to a preferred embodiment, the step of storing a disturbance zone J comprises identifying a predetermined distance d from the radar device 1. In particular, the disturbance zone J extends in the monitored zone W between the radar device 1 and the predetermined distance d. In other words, the disturbance zone J is a zone selected as a subset of the monitored zone W, and is defined as an area between the radar device 1 and the predetermined distance d from the radar device 1 itself. This disturbance zone J is always smaller than the monitored zone W and represents a zone in which chips or water drops may fall.

Figure 2:
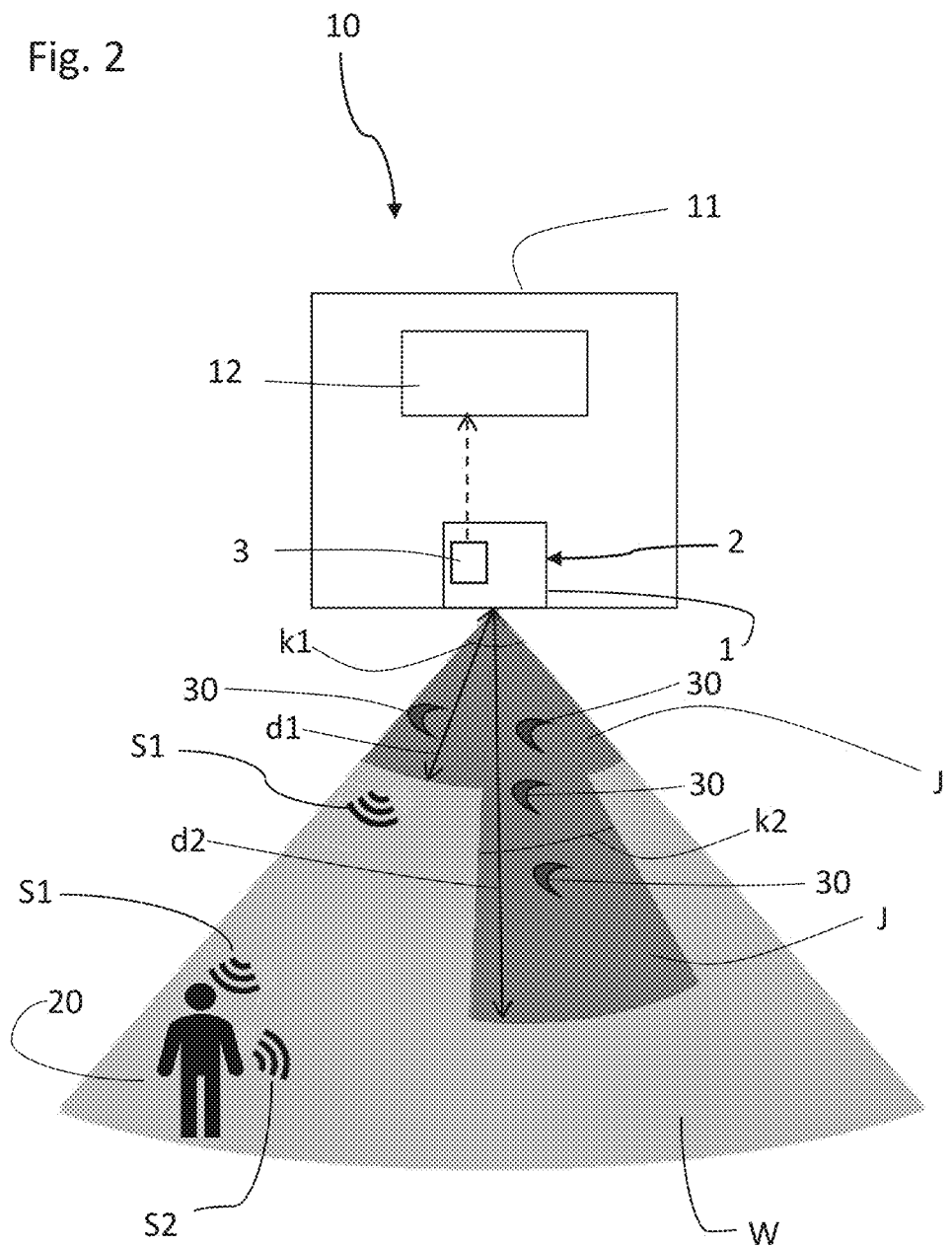

Particularly referring to FIG. 2, the disturbance zone J preferably comprises at least one sector defined by the predetermined distance d and by a range of angles k. This sector generally comprises a circular sector defined from the radar device 1 and extending along a length that is equal to the predetermined distance d. The range of angles k defines the width of this disturbance zone J within the monitored zone W, between two end angles measured with respect to a reference direction. Therefore, the predetermined distance d and the range of angles k determine the extent of the disturbance zone J within the monitored zone W. Optionally, the range of angles k is equal to the angular width of the entire monitored zone W.

Particularly referring to FIG. 2, according to a preferred embodiment, the disturbance zone J comprises a plurality of sectors. In particular, each sector is defined by a respective predetermined distance d and by a respective range of angles k. Therefore, the disturbance zone J may comprise several zones of various sizes within the monitored zone W.

For example, FIG. 2 depicts a disturbance zone J consisting of two sectors having different orientations. In particular, a first sector is characterized by a distance d1 and by a range of angles k1, and a second sector is characterized by a distance d2 and a range of angles k2. The longer-distance sector identifies directions in which the passage of disturbing elements 30 is more intense, while the shorter-distance sector ensures proper treatment of disturbing elements 30 which might deviate from these directions.

In one embodiment, the step of checking whether at least the initial position of the potential target falls within the disturbance zone J comprises checking whether each position of the plurality of positions assumed by the potential target during the overall detection time period falls within the disturbance zone J. That is, a process scrap is assumed to never come out of the disturbance zone J.

In other embodiments the initial position is sufficient, because the scraps from the disturbance zone J might come out of it. In yet other embodiments, the condition becomes checking whether the initial position is situated at a distance from the radar that is equal to the minimum distance detectable by the radar.

If the overall detection time period is less than the assessment time interval, and in particular each position assumed by the potential target falls within the disturbance zone J, then the potential target passed from within the disturbance zone J but is no longer detectable.

The potential target may not be detectable because it stopped within the disturbance zone J, i.e. fell and remained there, or because it might have passed therethrough for a short period and fell outside the monitored zone W.

Preferably, if the invalid target stops in the monitored zone W, the step of ignoring the target comprises assimilating the invalid target to the background data. In particular, that part of the detection profile corresponding to the return signal of a target recognized as invalid is assimilated to the background profile. For this to occur, the invalid target can for example stop for a time that is longer than the predetermined stop time. Thus, second signal components S2 related to further potential targets may be displayed while neglecting the return signal of those that have already been ignored.

In particular, the signal components that are compatible with the presence of a potential target are assimilated to the background profile once the potential target is classified as invalid if it remains within the disturbance zone J or, more generally, the monitored zone W.

The present invention also relates to a radar system 2 for carrying out the above discussed method. In particular, the present invention relates to a radar system 2 for detecting a valid target within a monitored zone W with disturbing elements 30 passing therethrough.

The radar system 2 of the present invention comprises at least one radar device 1. This radar device 1 is configured to generate and cyclically transmit a first radar signal S1 in the monitored zone W. Preferably, the radar device 1 is configured to generate and transmit a continuous wave radio signal, more preferably a frequency-modulated continuous wave radio signal. The radar device 1 is further configured to cyclically receive a second radar signal S2 representative of the monitored zone W.

The radar system 2 also comprises a control unit 3. The control unit 3 is in signal communication with the at least one radar device 1.

The control unit 3 is configured to cyclically process the second signal S2 to identify signal components compatible with the presence of a moving potential target.

In particular, the control unit 3 is preferably configured to convert the second signal S2 into a detection profile comprising peaks corresponding to potential targets.

The control unit 3 is also configured to define a background profile representative of the monitored zone W in absence of moving potential targets.

The control unit 3 is also configured to obtain a difference profile representative of the possible presence of potential targets, by subtracting the background profile from the detection profile.

The control unit 3 is configured to track the movement of the potential target during an overall detection time period in which the potential target is detectable and assumes a plurality of assumed positions from a first detection time in which the potential target assumes an initial position.

The control unit 3 is also configured to discriminate whether the potential target is a valid target or an invalid target. In particular, the control unit 3 discriminates whether the potential target is valid or invalid through the steps of storing a disturbance zone J defined by a portion of the monitored zone W proximal to the radar device 1.

Then, the control unit 3 is configured to define an assessment time interval. Such assessment time interval represents a time required to recognize whether the potential target is an invalid target or a valid target.

Then, the control unit 3 is configured to check whether the potential target simultaneously fulfills a plurality of conditions, including at least those as set forth below.

The control unit 3 is configured to check the first condition as mentioned above, i.e. that the initial position of the target potential falls within the disturbance zone J. Optionally, the control unit 3 is configured to check whether each position of the plurality of positions assumed by the potential target in the overall detection time period falls within the disturbance zone J.

The control unit 3 is also configured to check the second condition as mentioned above, i.e. that the overall detection time period is less than the assessment time interval.

If both conditions apply, the control unit 3 determines that the potential target is invalid. In this case, the control unit 3 ignores the potential target. If either condition is not checked, the control unit 3 is configured to validate the potential target.

The control unit 3 is also configured to trigger an alarm and/or signal the presence of a target when a target is validated.

Optionally, the control unit 3 is configured to assimilate the component of the detection profile, representative of a target defined as invalid, to the background profile if this remains stationary within the disturbance zone J and/or the monitored zone W.

The present invention finally relates to a processing system 10. In particular, the processing system 10 comprises the above-described radar system 2.

The processing system 10 further comprises a machine 11 that generates process scraps. In particular, the radar device 1 of the radar system 2 is installed on the machine 11. Alternatively, the radar device 1 is installed near a machine 11 that generates process scraps.

The control unit 3 of the radar system 2 is in signal communication with the machine 11. In particular, the machine 11 comprises a central unit 12 configured to control the operation of the machine 11. The control unit 3 is in signal communication with the central unit 12. In particular, the control unit 3 is configured to at least partially shut down and/or slow down the machine 11 when a target is validated. Advantageously, safety is ensured for an operator 20 that comes near the machine 11.

The invention claimed is:

1. A method for radar detection of a valid target within a monitored zone with disturbing bodies passing therethrough, the method comprising the steps of:
cyclically generating and transmitting a first radar signal in the monitored zone using at least one radar device;
cyclically receiving a second radar signal representative of the monitored zone;
cyclically processing the second signal to identify signal components compatible with the presence of a moving potential target;
tracking the movement of the potential target during an overall detection time period in which the potential target is detectable and assumes a plurality of assumed positions from a first detection time in which the potential target assumes an initial position;
discriminating whether the potential target is a valid target or a disturbing body, the step of discriminating comprising:
dividing the monitored zone into a disturbance zone and a remaining zone, the disturbance zone being proximal to the radar device and smaller than the monitored zone, the disturbance zone extending in the monitored zone between the radar device and a predetermined distance from the radar device;
defining an assessment time interval;
checking whether the potential target satisfies a plurality of conditions at the same time, including at least the following:
at least the initial position of the potential target falls within the disturbance zone,
the overall detection time period is less than the assessment time interval;
if it does, determining that the potential target is a disturbing body and ignoring the potential target, and if not validating the potential target.

2. A method as claimed in claim 1, wherein said assessment time interval is set equal or greater than a threshold time that a test disturbing body takes to stop.

3. A method as claimed in claim 1, wherein said disturbance zone at least partially surrounds the radar device.

4. A method as claimed in claim 1, wherein the radar device is installed on a machine that produces process scraps, said disturbance zone representing a drop zone, proximal to the machine, for the scraps produced by the machine in operation, the disturbing bodies being represented by the scraps.

5. A method as claimed in claim 1, wherein the disturbance zone comprises at least one sector defined by the predetermined distance and by a range of angles.

6. A method as claimed in claim 5, wherein the disturbance zone comprises a plurality of sectors, each sector being defined by a respective predetermined distance and a respective range of angles.

7. A method as claimed in claim 1, wherein the step of checking whether at least the initial position of the potential target falls within the disturbance zone comprises checking whether each position of the plurality of positions assumed by the potential target during the overall detection time period falls within the disturbance zone.

8. A method as claimed in claim 1, wherein:
the step of cyclically processing the second signal comprises:
storing background data representative of the monitored zone in absence of moving potential targets,
comparing the second signal with the background data to identify signal components compatible with the presence of a moving potential target;
the step of ignoring the disturbing body includes equating the disturbing body to the background data if the invalid target stops in the monitored zone.

9. A radar system for detecting a valid target within a monitored zone with disturbing bodies passing therethrough, said radar system comprising:
at least one radar device, configured to:
cyclically generate and transmit a first radar signal in the monitored zone;
cyclically receive a second radar signal representative of the monitored zone;
a control unit, in signal communication with the at least one radar device, said control unit being configured to:
cyclically process the second signal to identify signal components compatible with the presence of a moving potential target;
track the movement of the potential target during an overall detection time period in which the potential target is detectable and assumes a plurality of assumed positions from a first detection time in which the potential target assumes an initial position;
discriminate whether the potential target is a valid target or a disturbing body via the steps of:
dividing the monitored zone into a disturbance zone and a remaining zone, the disturbance zone being proximal to the radar device and smaller than the monitored zone, the disturbance zone extending in the monitored zone between the radar device and a predetermined distance from the radar device;
defining an assessment time interval;
checking whether the potential target satisfies a plurality of conditions at the same time, including at least the following:
the initial position of the potential target falls within the disturbance zone,
the overall detection time period is less than the assessment time interval;
if it does, determining that the potential target is a disturbing body and ignoring the potential target, and if not validating the potential target.

10. A radar system as claimed in claim 9, wherein said control unit is further configured to:
trigger an alarm and/or signal the presence of a target when a target is validated.

11. A method for radar detection, comprising the steps of:
cyclically generating and transmitting a first radar signal in a monitored zone using at least one radar device;
cyclically receiving a second radar signal representative of the monitored zone;
cyclically processing the second signal to identify signal components compatible with the presence of a moving potential target in the monitored zone;
tracking the movement of the potential target during an overall detection time period in which the potential target is detectable and assumes a plurality of assumed positions from a first detection time in which the potential target assumes an initial position;
dividing the monitored zone into a disturbance zone and a remaining zone, the disturbance zone being proximal to the radar device and smaller than the monitored zone, the disturbance zone extending in the monitored zone between the radar device and a predetermined distance from the radar device;
defining an assessment time interval;
for each potential target having initial position within the disturbance zone and overall detection time period less than the assessment time interval, determining that the potential target is a disturbing body and ignoring the potential target;
for each potential target having initial position within the disturbance zone and overall detection time period greater than the assessment time interval, validating the potential target as not being a disturbing body;
for each potential target having initial position outside the disturbance zone and overall detection time period less than the assessment time interval, validating the potential target as not being a disturbing body;
for each potential target having initial position outside the disturbance zone and overall detection time period greater than the assessment time interval, validating the potential target as not being a disturbing body.

* * * * *